United States Patent
Strickland (10) Patent No.: US 12,376,558 B1
(45) Date of Patent: Aug. 5, 2025

(54) LIGHT TRAPS, PANELS FOR LIGHT TRAPS AND RAIL APPARATUS

(71) Applicant: T. Randall Strickland, Asheboro, NC (US)

(72) Inventor: T. Randall Strickland, Asheboro, NC (US)

( * ) Notice: Subject to any disclaimer, the term of this patent is extended or adjusted under 35 U.S.C. 154(b) by 1005 days.

(21) Appl. No.: 17/024,346

(22) Filed: Sep. 17, 2020

Related U.S. Application Data (60) Provisional application No. 62/902,725, filed on Sep. 19, 2019.

(51) Int. Cl.
*A01K 1/00* (2006.01)

(52) U.S. Cl.
CPC .................................. *A01K 1/0064* (2013.01)

(58) Field of Classification Search
CPC .................................................... A01K 1/0064
USPC ......................................................... 454/276
See application file for complete search history.

(56) References Cited

U.S. PATENT DOCUMENTS

| | | | | |
|---|---|---|---|---|
| 2,364,378 A * | 12/1944 | Levinsen | ................ | F24F 13/08 454/81 |
| 3,285,156 A * | 11/1966 | Bohanon | ................ | F24F 13/08 55/440 |
| 3,628,442 A | 12/1971 | Nijhuis | | |
| 5,238,451 A * | 8/1993 | Wulf | ....................... | F24F 13/08 454/282 |
| 5,601,485 A | 2/1997 | Gigola | | |
| 6,367,937 B2 | 4/2002 | Koster | | |
| 8,684,803 B2 | 4/2014 | Berkompas | | |
| 8,714,758 B2 | 5/2014 | Strickland et al. | | |
| 10,337,750 B2 | 7/2019 | Teeters | | |
| 2006/0080890 A1 | 4/2006 | Nowak | | |
| 2015/0111487 A1* | 4/2015 | Son | ........................ | F24F 3/044 454/329 |

OTHER PUBLICATIONS

Value Tronics International, Inc.; International Lights, Inc. II-170 Research Radiometer information retrieved from the Internet Feb. 16, 2010.

\* cited by examiner

*Primary Examiner* — Allen R. B. Schult
(74) *Attorney, Agent, or Firm* — MacCord Mason PLLC (57) ABSTRACT

Light traps, panels for light traps, and accessory devices are shown and described. In one example, a trap comprises a plurality of panels defining waveforms for at least a portion. The waveforms may be spaced a distance D apart to define a plurality of non-linear air-passages for allowing an airflow (AF) into or out of the poultry house at a velocity (V). The waveforms may include a plurality of light deflective walls (LDWs) for increasing the light reduction factor (RFL). A rail and/or rail system may be included for securing panels within the light trap.

18 Claims, 14 Drawing Sheets

LIGHT TRAPS, PANELS FOR LIGHT TRAPS AND RAIL APPARATUS

This application claims the benefit of Application Ser. No. 62/902,725 filed Sep. 19, 2019.

FIELD

The current disclosure relates generally to poultry houses, and more particularly to light traps and associated devices for poultry houses, the traps having increased light reduction and rails.

BACKGROUND

Light traps, e.g. those for poultry houses, are known in the art. In general functional terms, light traps block natural light, while allowing air to flow through. As such, they can be used in combination with artificial lights to create an artificial diurnal cycle inside a structure. In poultry houses, an artificial diurnal cycle may be important for a variety of reasons, including for example, the induction of egg-production in breeding hens. Some poultry farmers may also use diurnal cycles to regulate behavior or physiology in birds, e.g., in broilers for example.

As noted, light traps are constructed to allow airflow though the trap. The flow of air through the trap and into the poultry house is important for a variety of reasons, including, inter alia, the health and fitness of the birds. For example, air flow decreases litter moisture thereby minimizing conditions suitable for pathogen establishment or multiplication. Proper airflow may also be important for regulating or maintaining a uniform temperature in the house, or allowing fresh air to circulate on ground level, etc.

Figure 1:
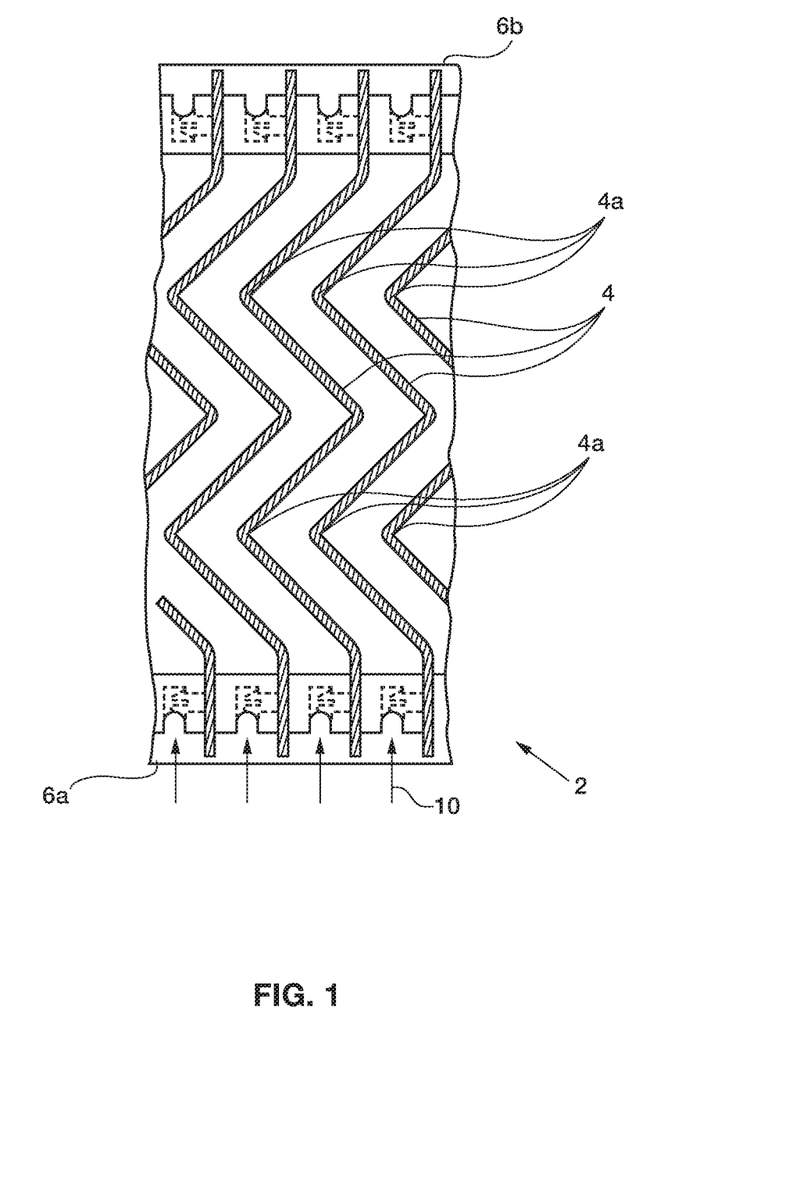
FIG. 1 shows a cut-away view of a known light trap.

Applicant believes that many existing light traps require users to compromise either resistance to light transmission or resistance to airflow. FIG. 1, for example, illustrates a known light trap 2, which provides satisfactory resistance to light transmission at the price of increased resistance to airflow. Light trap 2 includes a plurality of panels 4, each defining a plurality of right angles 4a. Right angles 4a reduce light transmission from an outside 6a to an inside 6b, and create a resistance to airflow 10.

Light trap systems can be large and bulky for shipping and installation and Applicant realizes often difficult to install and/or secure for proper functioning.

It is to at least one or more of these or additional problems that the current disclosure is directed.

SUMMARY

By way of brief summary, the current disclosure is directed to light traps, light trap associated devices, e.g., light traps for poultry houses, having light deflective walls (LDWs) positioned on panels of the trap, and/or panel rails. The current disclosure is also directed to panels for light traps, wherein the panels include LDWs. Using LDWs, applicant has discovered that resistance to light transmission can be increased.

Applicant has also discovered that the light trap panels may be better secured and that provides easier assembly, while securing the panels more efficiently.

The above summary was intended to summarize certain examples of the present disclosure. Systems and panels will be set forth in more detail, along with examples demonstrating efficacy, in the figures and detailed description below.

DETAILED DESCRIPTION OF EXEMPLARY EMBODIMENTS

Figure 2:
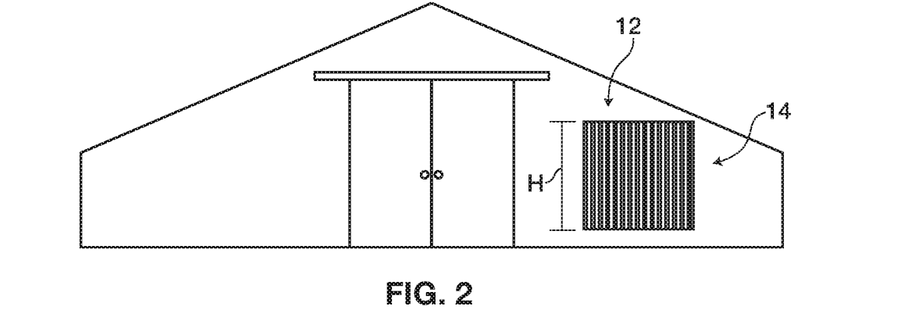
FIG. 2 shows a front view of light trap positioned within a structure.
Figure 3:
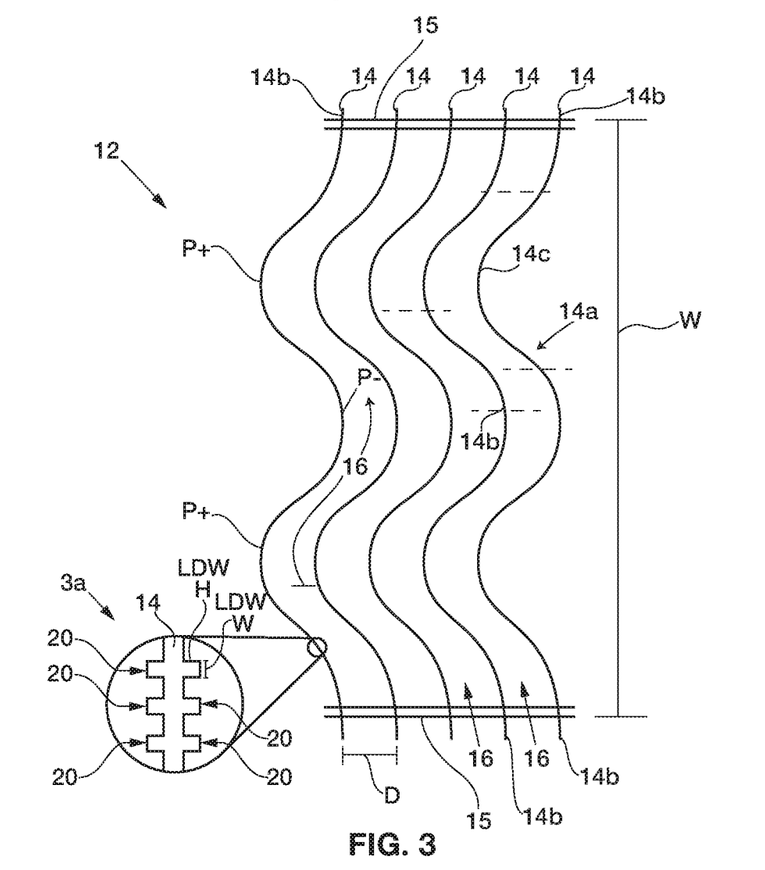
FIG. 3 shows one example of a cut-away view of a light trap as disclosed herein.
Figure 4:
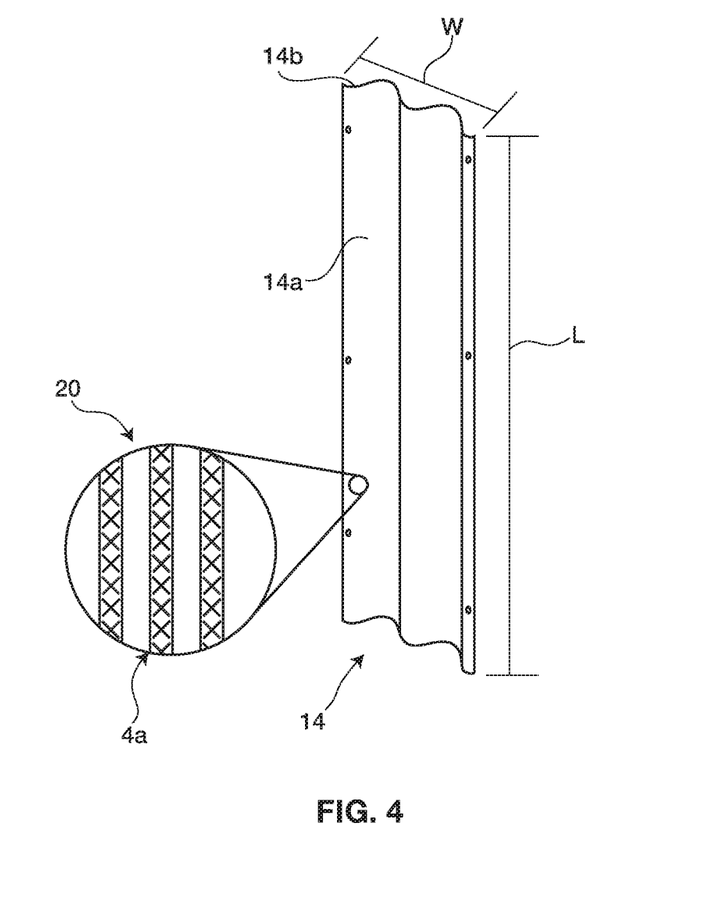
FIG. 4 shows a perspective view of one example of a panel for a light trap as disclosed herein.

FIG. 2 shows a front view of light trap 12, which is one example of a light trap as disclosed herein, positioned in a structure, e.g. a poultry house. FIG. 3 shows a cut-away view of light trap 12 including panels 14 and housing 15. FIG. 4 shows an isolated panel 14, which may be considered one of the plurality of panels of trap 12.

Figure 5:
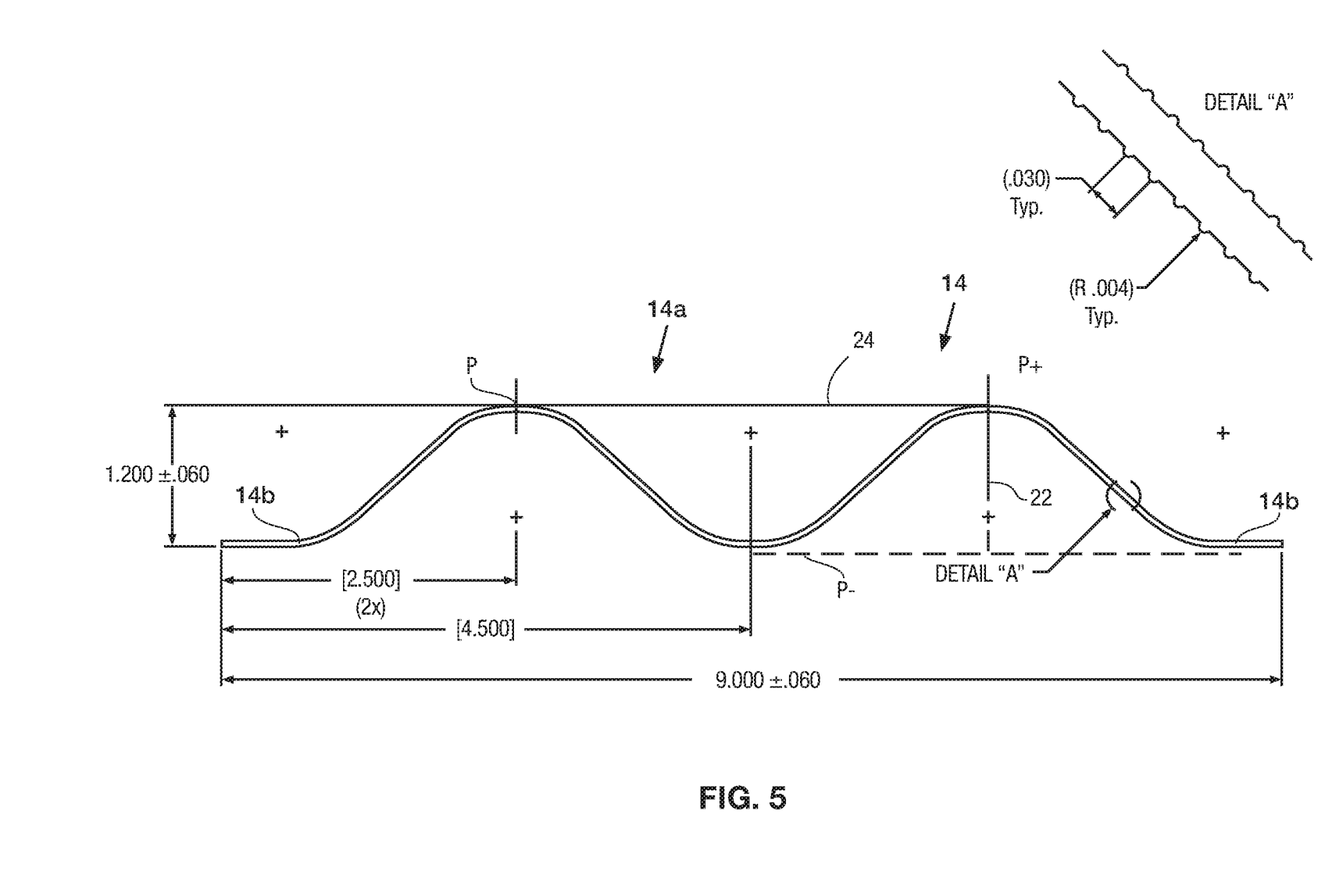
FIGS. 5 and 6 show manufacturing specifications for an example of a panel as disclosed herein.
Figure 6:
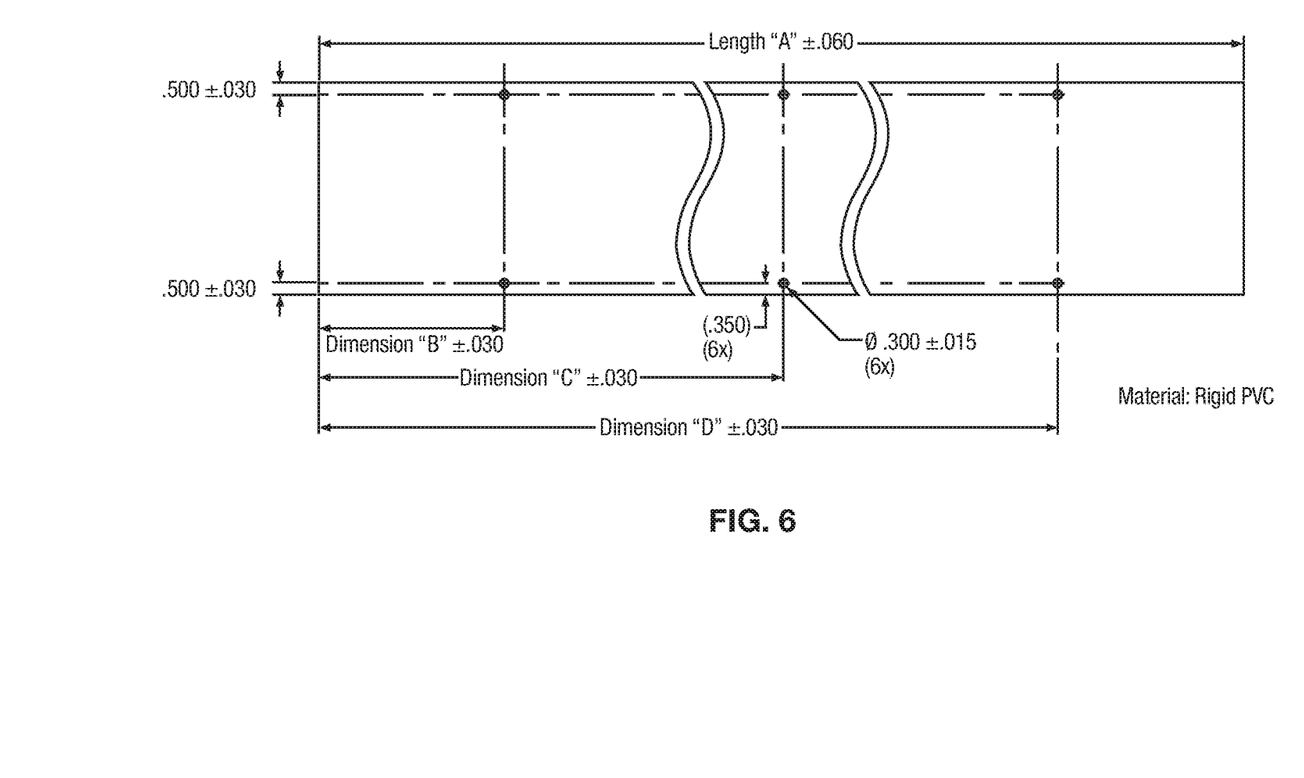

FIGS. 5 and 6 show various manufacturing specifications and views of a panel example, which may be considered similar to panel 14. Similar reference numbers will be used to refer to similar parts shown in the various figures. It should be clear however from the description below that trap 12 is representative of a variety of light trap examples, variations of which are described below.

In this example, trap 12 includes a plurality of panels 14. Each panel 14 is described as having a width W and a length L. Panels 14 define a waveform 14a for at least a portion. As seen, waveforms portions 14a travel in the width direction of the panel. Waveform portions include a plurality of peaks (P), including at least one positive peak and at least one negative peak. Positive and negative are used to indicate relative peak direction. In this example, each panel 14 may be considered to have two positive peaks (P+) and one negative peak (P−) for reference only.

Panels may be completely waveform, or may have other non-waveform portions, e.g., interface edges 14b, which may be straight for example. Straight portions, e.g. 14b, may be used for mounting purposes, etc. Non-waveform portions may also be located in other locations between the edges. Trap examples including a plurality of panels defining a waveform for at least a portion in addition to at least one panel not defining a waveform, are still considered to fall within the scope of the disclosure.

A variety of different waveforms may be used for traps disclosed herein. Referring to FIG. 5, for example, peak-to-peak amplitude 22 can vary. For example, peak-to-peak amplitude may be in the range of about 0.5 to about 3 inches, in the range of about 0.5 to about 2 inches, and in the range of about 0.8 to about 1.4 inches. In the example shown peak-to-peak amplitude is about 1.2 inches. Somewhat similarly, wavelength 24 may also vary. For example, wavelength 24 may be in the range of about 2 to about 8 inches, in the range of about 3 to about 6 inches, and in the range of about 4 to about 5 inches. In the example shown, wavelength 24 is about 4.5 inches. Further, the shapes of the waves themselves may vary in some examples. In the example shown, the wave shape is sinusoidal, but other examples may include other shapes, e.g., sawtooth, etc.

Referring back primarily to FIG. 3, in terms of trap construction, panels 14 are positioned are spaced a distance D apart such that their waveform portions define a plurality of non-linear air-passages 16 for allowing an airflow (AF) into or out of the poultry house at a velocity (V). As used herein, non-linear is intended to mean that, for at least one air passage, a straight line cannot be drawn from an air trap entrance to an air trap exit. The distance D between panels can vary from trap to trap and within a trap, base on, for example, peak-to-peak amplitude, with greater amplitudes allowing for greater D. In some examples, D may be in the range of about 0.5" to about 2" from the center of one panel to the center of an adjacent panel. In many examples, D will be about 0.75" from the center of one panel to the center of the next panel. The resultant air-passages have a resistance to airflow (RAF) and a light reduction factor (RFL). In some examples, D may be correlated with a desired RFL, for example, D may be greater if a lower RFL is acceptable. Spacing between panels may be achieved, for example, by a housing, e.g. housing 15, having recesses, flanges, slots, etc. for securing an interface edge of the panel. In some examples, panels may be secured directly to the structure, e.g. without a housing, by individually fastening a portion of the panel to the structure. Such examples may also be considered light traps, as used herein.

Panels 14, e.g. waveform portions of panels, have a plurality of light deflective walls (LDWs) 20 as illustrated in cross-sectional enlargement 3a, surface enlargement 4a and detail A of FIG. 5. LDWs are constructed to increase the RFL. LDWs may also be constructed to maintain a comparable RAF relative to a control without LDWs. LDWs shape, height, positioning, concentration, and orientation may vary from example to example.

Regarding shape of the LDW, it may vary. In some examples, the LDWs may be rectangular shaped, e.g. as illustrated in FIG. 3. In other examples, LDWs may be semicircular, e.g. as illustrated in FIG. 5, detail A. Still in other examples, LDWs may have other shapes, e.g., triangular. LDWs may also include a combination of shapes within a panel.

Regarding height, in some examples, LDWs have a height (LDW-H) in the range of about 0.01 mm to about 2 mm, in the range of about 0.05 to about 0.5 mm, and in the range of about 0.1 to about 0.5 mm. In many examples, LDWs will have a height of about 0.1 mm. Width may similarly vary from example to example. In many examples, width of the walls (LDH-W) will be similar to height, e.g any of H±2 mm, H±1 mm, H±0.5 mm, H±0.5 mm, and H±0.1 mm.

Regarding positioning, in some examples, LDWs will be positioned on the entire waveform portion and on both sides of the waveform. In other examples, LDWs will be positioned on lesser portions of the waveform. For example, some waveform portions include LDWs positioned on at least one of: at least 25% of a wavelength, at least 50% of a wavelength, at least 75% of a wavelength; and about 100% of the wavelength. Further, in many examples, panels will be positioned such that the LDWs of one panel overlap, at least partially, with the LDWs of an adjacent panel. For example in FIG. 2, at least panel portion 14c contains LDWs and at least adjacent panel portion 14b contains LRW, which overlap with LDWs in portion 14c. Other examples may include more or less overlap.

Regarding orientation, LDWs will typically be oriented non-parallel to the direction of the waveform. For example, LDWs 20 in cross-sectional enlargement 3a and LDWs 20 in surface enlargement 4a are shown perpendicular to the direction of the waveform.

In other examples, the LDWs are oriented perpendicularly (±80°) relative to the direction of the waveform. More typically, the LDWs are oriented perpendicularly (±5°) relative to the direction of the waveform.

Regarding concentration, LDWs may be positioned in a variety of concentrations. For example, LDWs may be positioned at a concentration chosen from at least one of the following ranges: about 5 to about 20 LDWs/cm, about 8 to about 18 LDWs/cm; and about 10 to about 15 LDWs/cm.

In terms of construction, LDWs may be created in a variety of ways. For example, LDWs may be defined by the panel itself, e.g., by extrusion. Somewhat similarly, LDWs may be formed by cutting channels into a preformed panel, thereby creating walls between cuts. Further, LDWs may be attached to panels, e.g., by sonic welding. Still other examples may include other ways of forming.

Using light traps as disclosed herein, RFL may be improved. For example, RFL may be increased by a factor chosen from at least one of: at least 1.2×, at least 1.3×, at least 1.4×, at least 1.5×, at least 1.6×, at least 1.7×, at least 1.8×, at least 1.9×, at least 2.0×, at least 2.1×, at least 2.2×, at least 2.3×, at least 2.4×, at least 2.4×, at least 2.5×, at least 2.6×, at least 2.7×, at least 2.8×, at least 2.9×, and at least 3.0×. Other examples may provide other improvements.

In addition to significant improvements in RFL, many examples will not significantly increase RAF. For example, RFL may be increased without increasing RAF by greater than 0.25 inches H20, or greater than 0.10 inches H20, at a velocity of 600 fpm.

Further, some panels may have an antistatic component, e.g. an additive in the panel itself or a coating applied to the panel, to inhibit particles from bonding to panels. Applicant believes that antistatic component will provide for improved RAF. Examples including antistatic components include traps with panels having LDWs as well as panels without LDWs.

Using the teachings contained herein, any of a variety of benefits may be achieved. For example, RFL may be significantly increased without sacrificing RAF. Further, existing traps can be replaced, e.g., similar to the trap in FIG. 1, to provide similar levels of RFL and provide a significant decrease in RAF, thereby providing significant energy savings. Applicant estimates, for example, that the current disclosure can be used to provide an approximately 30% savings in energy without significant sacrifice to RFL in some examples.

The following experimental data is for purposes of illustrating efficacy, not limitation.

EXPERIMENTS

Experimental Trap A ("Etrap A) referenced in the Experiments below refers to a trap having the specifications illustrated in FIGS. 5 and 6 and their accompanying description.

Control Trap referenced in the Experiments below refers to a trap having specifications similar to Etrap with the exception of the LDWs, which are lacking in the control.

Experiment 1: Resistance to Light Transmission

Traps were mounted in a 48"×48" opening in a light blocking wall. Four 1500 W halogen lamps were placed on one side of the trap to simulate direct sunlight. Light measurements were taken outside the trap and inside the trap using an International Light IL-1710 Light meter. The light reduction factor (RFL) was calculated by dividing the outside light intensity by the inside light intensity. A higher RFL indicates a greater resistance to light transmission.

Control Trap Results
1. Light Intensity Outside (fc)
Readings: 5460, 5000, 6350, 6440, 5660, 6110
Mean: 5837
2. Light Intensity Inside (fc)
Readings: 0.00055, 0.00055, 0.00057, 0.00075, 0.00038, 0.00064
Mean: 0.000563
3. Light Reduction Factor (RFL) (Outside/Inside)=10,400,000

ETrapA Results
1. Light Intensity Outside (fc)
Readings: 6000, 5070, 6880, 6860, 6000, 6370
Mean: 6197
2. Light Intensity Inside (fc)
Readings: 0.00030, 0.00039, 0.00011, 0.00023, 0.00014, 0.00024
Mean: 0.000253
3. Light Reduction Factor (RFL) (Outside/Inside)=26,370,000

As seen, the invention example provides greater than 2.5λ improvement in light reduction relative to the control.

Experiment 2: Resistance to Airflow

Traps were mounted in a 48"×48" opening in a BESS Lab airflow measurement chamber. Static pressure was measured in inches of water ("in. water") at velocities ranging from approximately 200 feet per minute ("fpm") to approximately 1100 fpm.

At a given face velocity, a lower static pressure indicates less airflow resistance.

| Control Trap | | |
|---|---|---|
| Static Pressure (in. H20) | Airflow (cfm) | Velocity (fpm) |
| 0.010 | 3219 | 201 |
| 0.015 | 3990 | 249 |
| 0.020 | 4469 | 279 |
| 0.040 | 6353 | 397 |
| 0.050 | 7148 | 447 |
| 0.080 | 9179 | 574 |
| 0.100 | 10388 | 649 |
| 0.125 | 11498 | 719 |
| 0.150 | 12707 | 794 |
| 0.200 | 14747 | 922 |
| 0.250 | 16440 | 1028 |
| 0.300 | 18127 | 1133 |

| ETRAP A | | |
|---|---|---|
| Static Pressure (in. H20) | Airflow (cfm) | Velocity (fpm) |
| 0.010 | 3395 | 212 |
| 0.015 | 4098 | 256 |
| 0.020 | 4514 | 282 |
| 0.040 | 6466 | 404 |
| 0.050 | 7275 | 455 |
| 0.080 | 9271 | 579 |
| 0.100 | 10371 | 648 |
| 0.120 | 11420 | 714 |
| 0.150 | 12785 | 799 |
| 0.200 | 14788 | 924 |
| 0.250 | 16432 | 1027 |
| 0.300 | 17977 | 1124 |

As seen, the invention example provides virtually identical resistance to airflow patterns.

Figure 7:
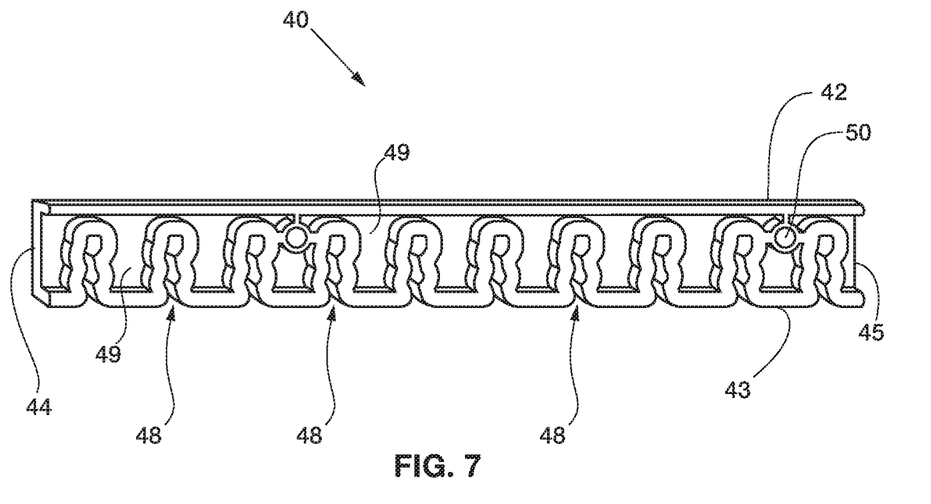
FIG. 7 is a side perspective view of one example of a light trap rail for securing light trap panels according to the present disclosure.
Figure 8:
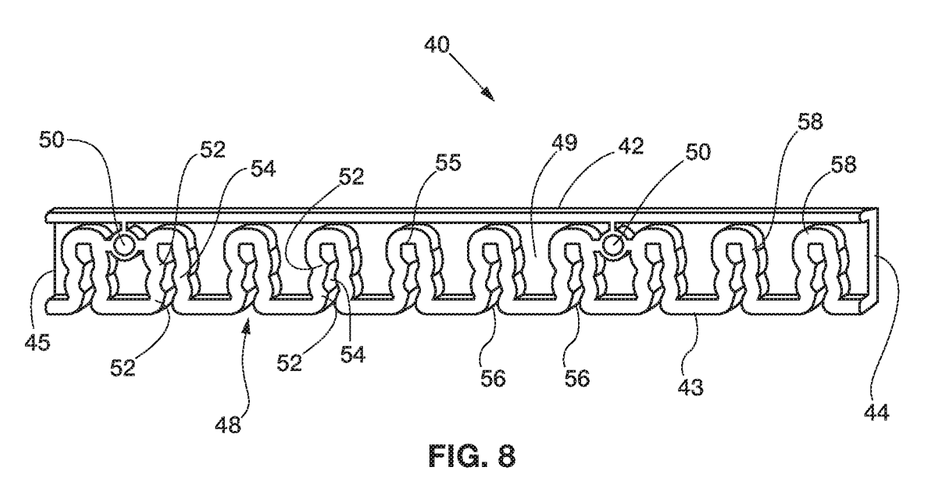
FIG. 8 is a side perspective view of the alternate side of the light trap rail of FIG. 7,
FIG. 9a-9d are various views of one example of the light trap panel of FIG. 7.
Figure 9A:
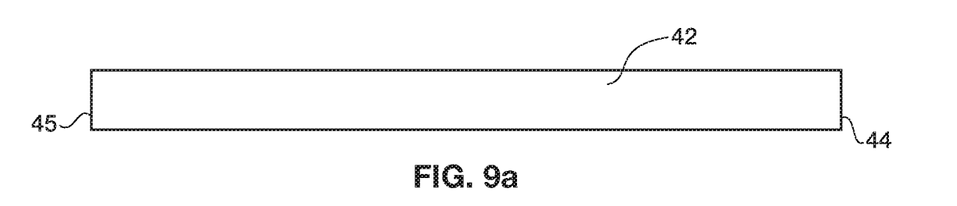
Figure 9B:
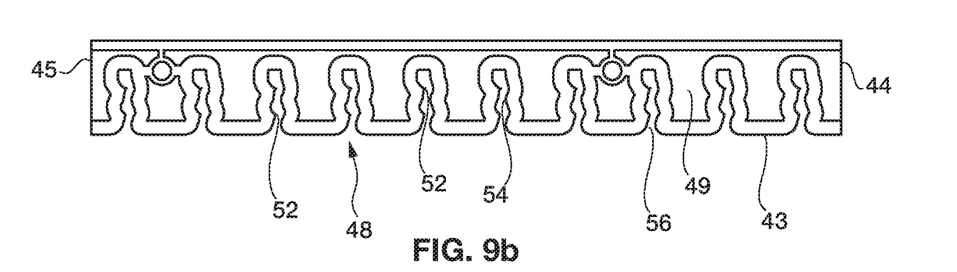
Figure 9C:
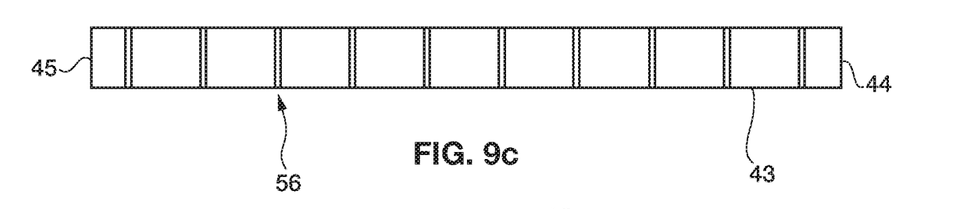
Figure 9D:
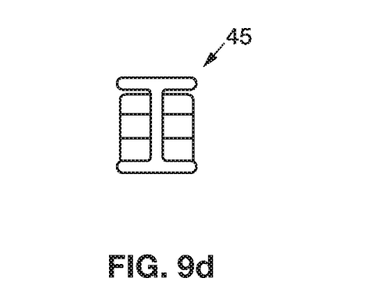

Rails 40 may secure a set of panels 14 within a light trap 12. A rail 40, an example as seen in FIGS. 7 and 8, may be included with a light trap assembly and/or system for securing the panels 14 in place within the light trap 12. Conventionally, individual rounded spacers and rods have been employed to space panels 14 within light trap systems. However, applicant realized that placing spacers between each panel makes for more complicated installation and may add expense to the systems. Further, more consistent spaced apart distance D and more efficient retention of the panels 14 is desired. Rails 40 not only make installation more efficient, rails 40 may also serve to better secure panels with less installation parts and expense.

Rail 40 may include a top 42, a bottom 43 a first end 44 and a second end 45. The first end 44 and the second end 45 may span a length of a light trap 12. A body 49 of the rail 40 may include a set of channels 48. The channels 48 may extend lengthwise between the bottom 43 and the top 42. The channels 48 may include an opening 56 along the bottom 43 and may be closed at a top portion 48' of the channel 48. The channels may terminate at top portion 48' and not extend all the way to top 42. The top 42 may be spaced apart from the top portion 48'. The top portion 48' of the channel 48 may be curved. The channel 48 may include a side 48a and an opposing side 48b. Sides 48a, 48b may be non-linear sides. Sides 48a, 48b may be non-parallel sides. Sides 48a, 48b may alternately curve away from and/or into the groove 48. The top portion 48' of the channel 48 may be continuous with the side 48a and the side 48b. The channel 48 may have an outside face 58. The outside face 58 may be spaced apart from the inside of the of the channel 48a, 48', 48b by and extended face 58'. The dimensions of face 58 may mimic that of the inside of channel 48.

Figure 13:
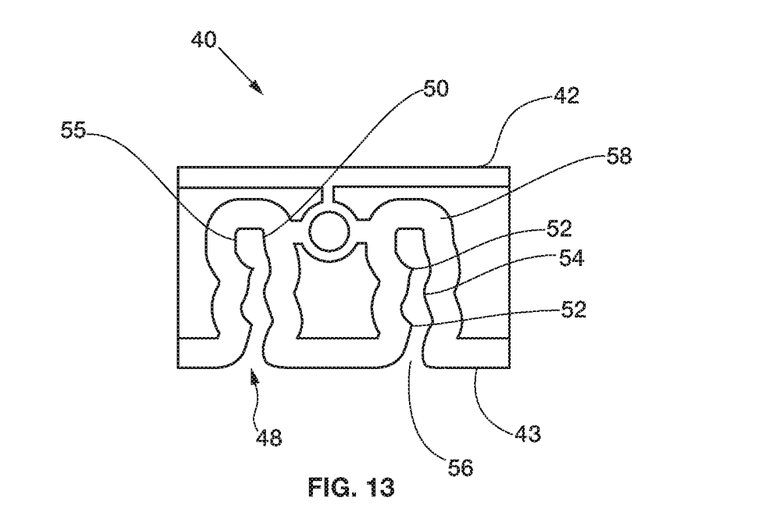
FIG. 13 is a close up view of one example of the light trap panel of FIG. 11.

The channel side 48a may include one or more projections 52. The channel opposing side 48b may include one or more projections 54. The channel sides 48a, 48b are interchangeable. In some examples, Channel side 48a, may include at least two projections that project into the channel 48, an upper projection located more distal to the opening 52 and a lower projection located more proximal to opening 52. There may be a recession between the upper projection and the lower projection. The opposing channel side 48b, may include at least one projection, the opposing channel side projection 54 may project in a position substantially medial to the upper projection and the lower projection. The projections 52, 54 may serve as teeth gripping by opposing forces F1, F2 a panel terminating end (see FIG. 13).

The rail 40 may include an offset angled leg 57 at the entrance of opening 56. The leg 57 may assist in directing a terminating end into channel 48.

FIGS. 9 through 13 show exemplary rails 40 along with some exemplary dimensions for rail 40. By way of example, FIG. 9a shows a top view 42, FIG. 9b shows a body 49 side view, FIG. 9c shows a bottom view 43, and FIG. 9d shows an end view 45 and/or 44, of a rail 40. The channels 48 may be spaced apart so as to configure a distance D between the panels 14 (see FIG. 3) secured within the channels 48. By way of example, a space S between a medial point of adjacent grooves may be about 0.8 inches. In some examples, the space S may be more than 0.7 inches or less than 0.9 inches. In other examples, the space S may be in a range of between 0.6 inches and 0.9 inches.

A space S2 may be formed between the terminating points of projections 52, 54. The space S2 may in one example be about 0.04 inches. The space S2 may in other examples be more than 0.03 inches or less than 0.05 inches. Still in other examples, the space S2 may be greater than or less than 0.04 inches. Space S2 may be substantially between about 0.2 inches and 0.6 inches.

A panel 14 terminating end may extend about 0.7 inches into a channel 48. A panel 14 may extend further or less than 0.7 inches into a channel 48. A panel may extend in a range of between 0.6 to 0.8 inches into a channel.

Figure 10:
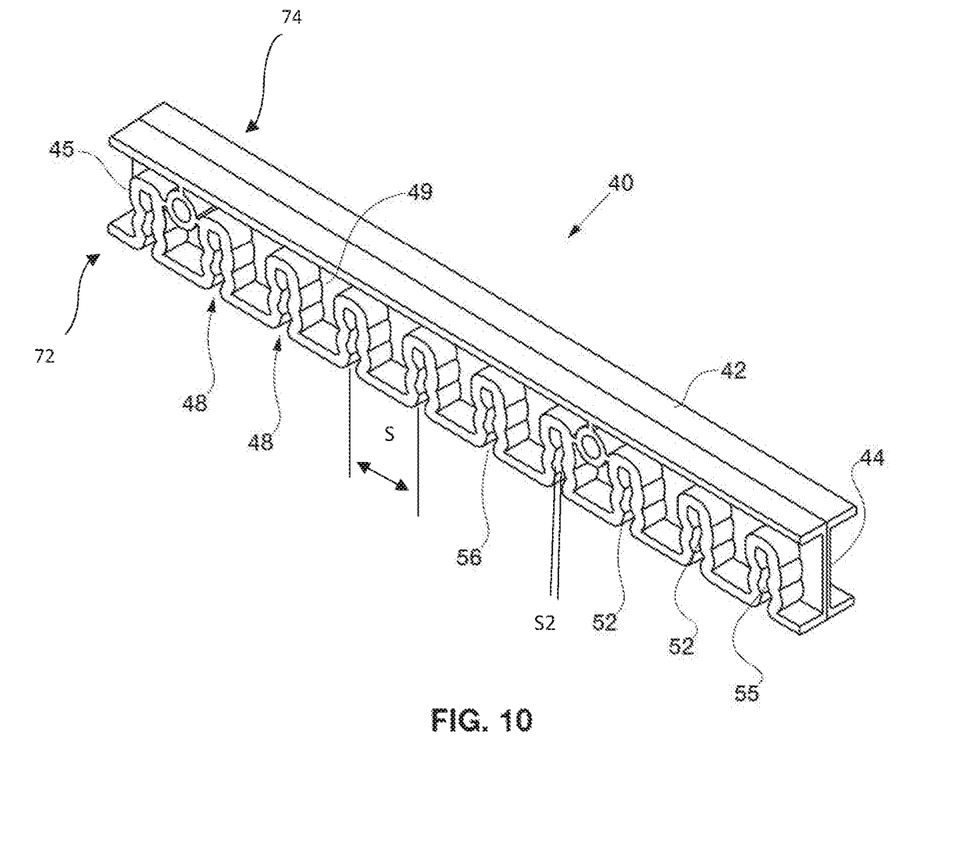
FIG. 10 is a top perspective view of one example of the light trap panel of FIG. 7,
FIG. 11a-11d are various views of one embodiment of a light trap panel rail.
Figure 11A:
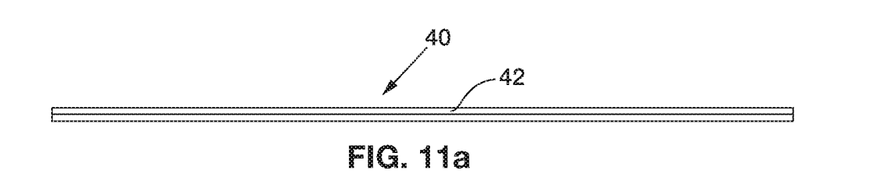
Figures 11B, 11C:
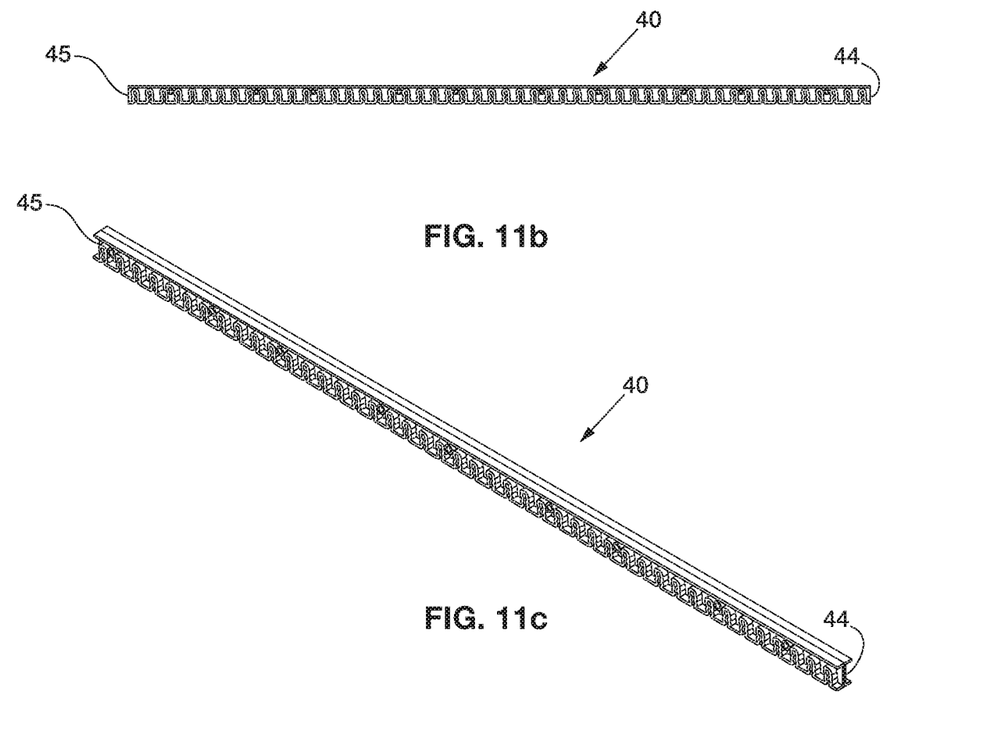
Figure 11D:
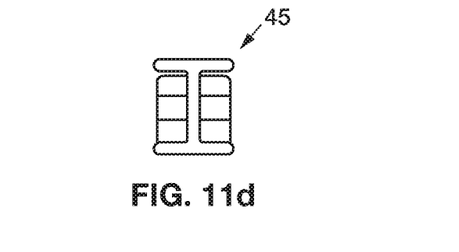
Figure 12A:
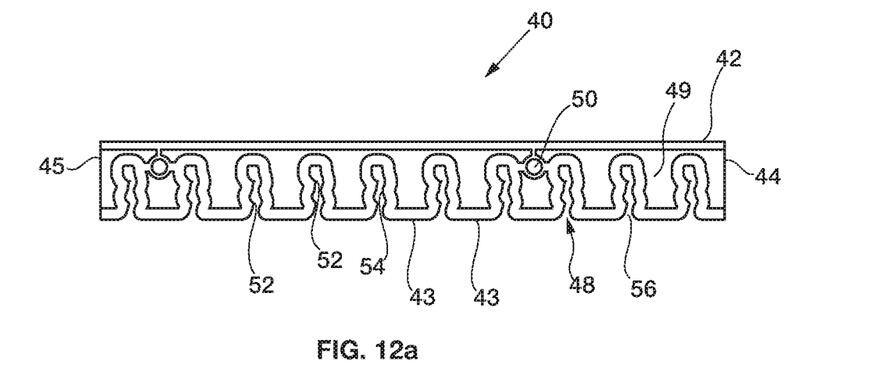
FIG. 12a-12c are close up views of the light trap panel of FIG. 11.
Figure 12B:
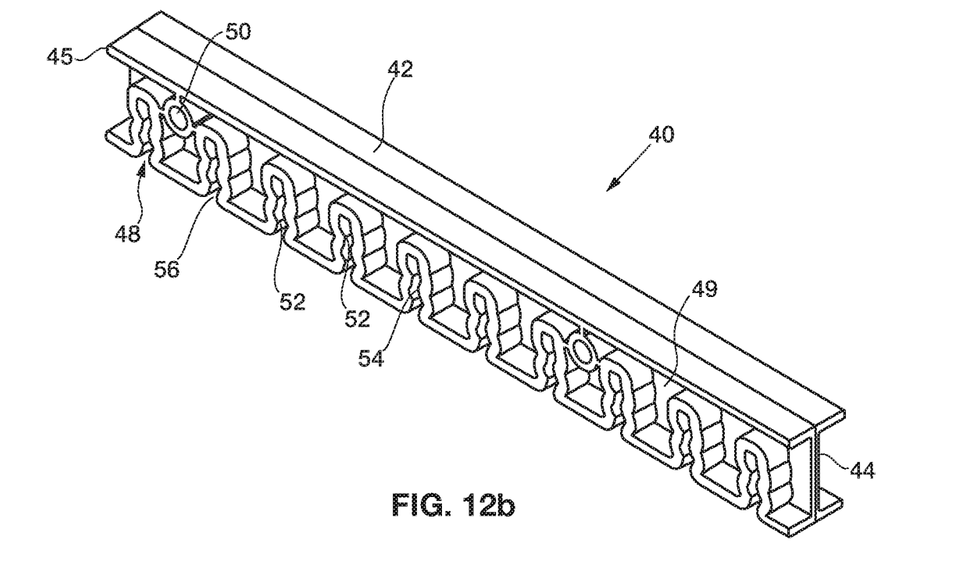
Figure 12C:
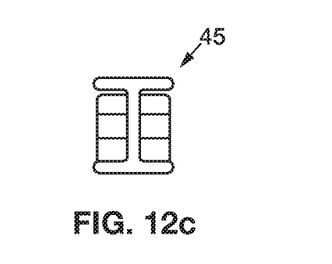

Rail 40 may include a front 72 and a back 74, as seen in FIG. 10. The front and back 72, 74 may reflect mirror image dimensions and shaping. In the front 72 and back 74, the outside face 58 (see FIG. 13) may extend beyond the body 49 on the back and the front 72, 74. The outside faces 58 may be continuous between the front and back 72, 74, and in some examples may be wider than the rail body 49. The rail 40 may be about 1.0 inch in height between the top 42 and bottom 43. The channel may extend between about 0.6 and about 0.8 inches along the height of the rail 40. Enough stability for the panels is desired within the rail to secure them within the rail channel 40 while still wanting some panel freedom of movement within the light trap system. The channels 48, in some examples, are not entirely rigid and allow some slight degree of flexibility, however, are rigid enough to maintain a panel between the projections when installed, so the projections may be considered semi-rigid. The slight give in a rail allows maneuvering of a panel 14 into the channel 48 and the opposing force between the projections 52, 54 secure the panel in place. In some examples the rail 40 may be a plastic material, by way of example, a talc filled polypropylene. In other examples, the rail 40 may be a metal material. A light weight rail 40 may be advantageous by not adding significantly to the weight of the overall light trap.

In some examples, the light deflective walls 20 interface with the projections 52, 54. The interface of walls 20 and projections 52, 54, in some examples, may produce a more solid grip on the panels 14 within the light trap 12. In some instances, the walls 20 and projections 52, 54 interface act as stabilizers over and above just serving as spacers.

The rail 40 may include a rod insert 50. The rail 40 may include more than one rod insert 50. The rod insert 50 may be spaced with 6 channels in-between. The rod insert may be spaced S3 at about 4.0 to about 6.0 inches apart from one another along the rail 40. The rod insert 50 may link with one or more outside face 58.

Figure 14:
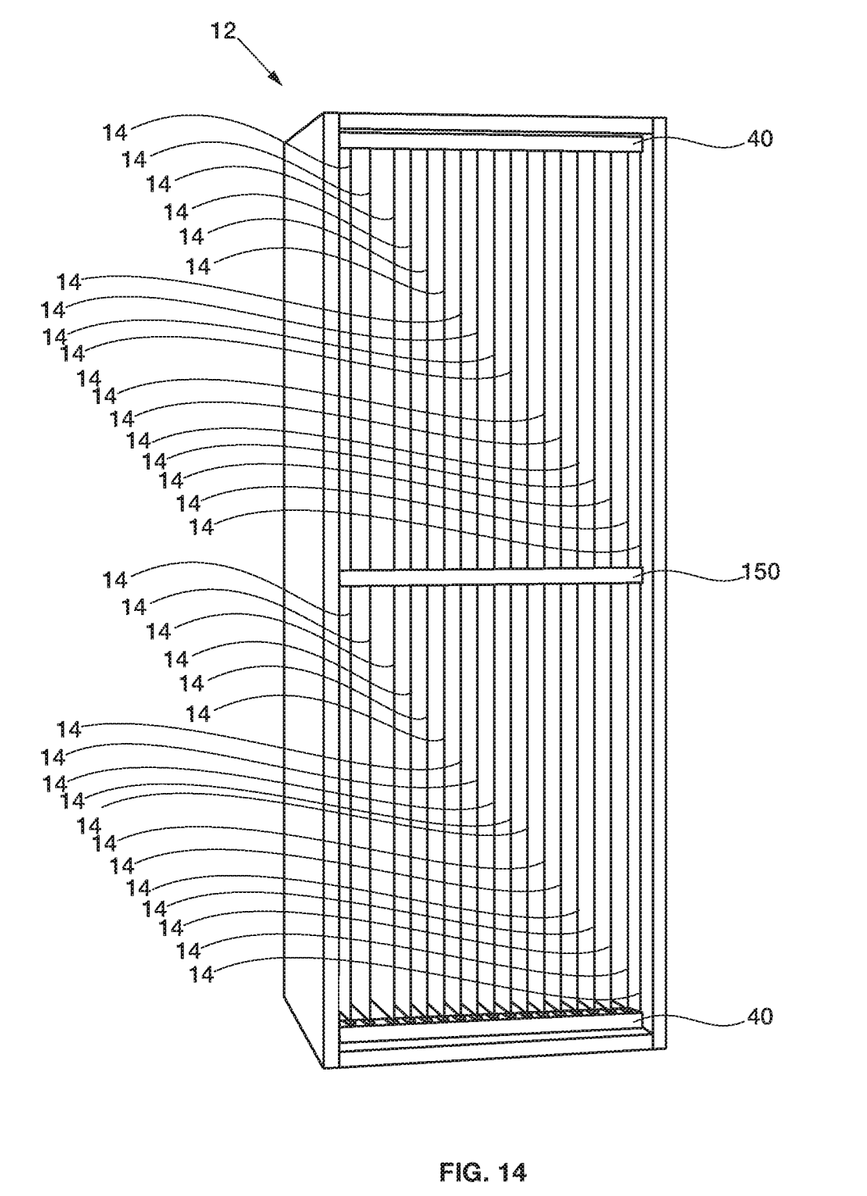
FIG. 14 is top perspective view of one example of a light trap including light trap panels and light trap rails.
Figure 15:
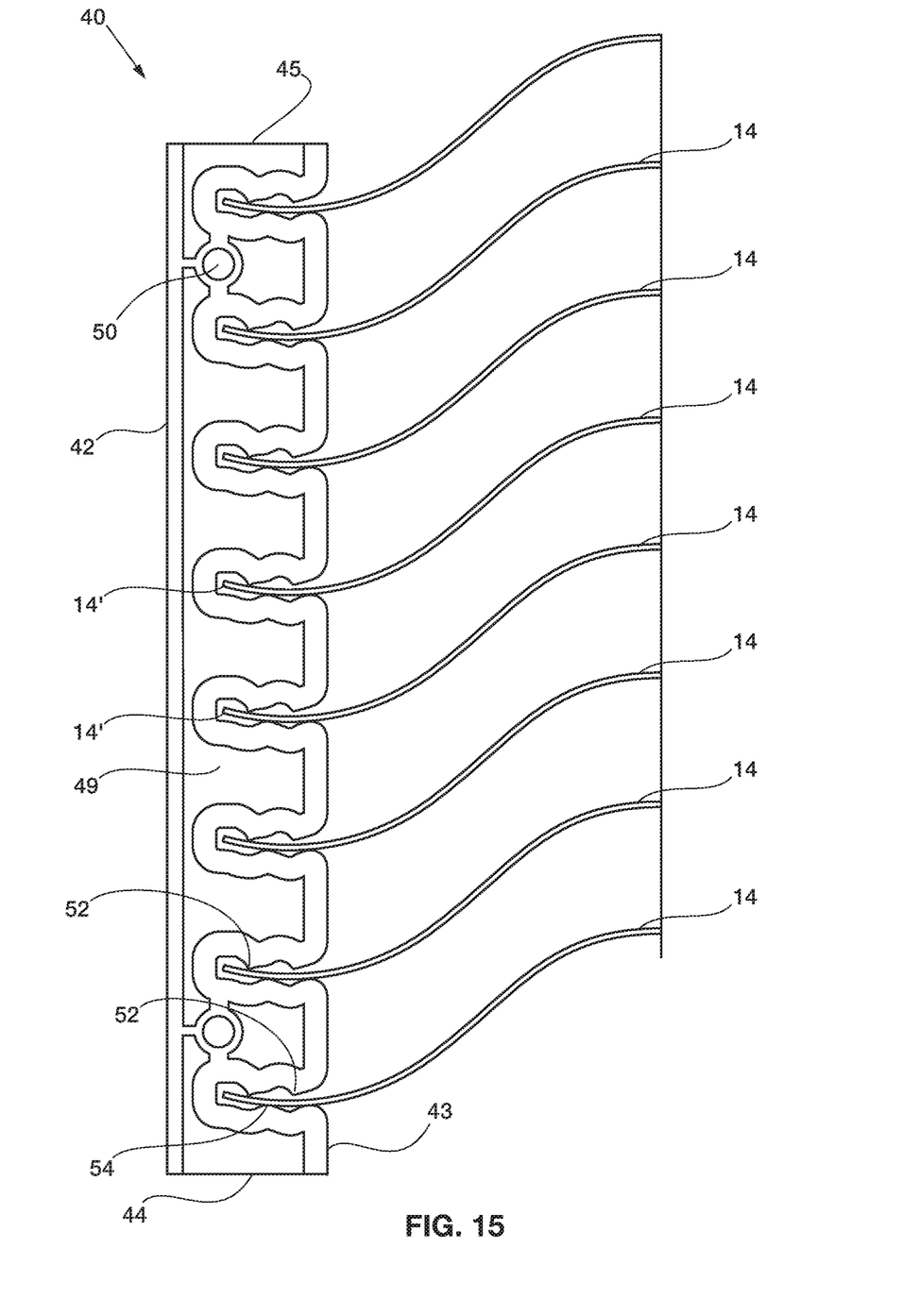
FIG. 15 is a close up view of the interface of the light trap panels and one example of a light rail.
Figure 16:
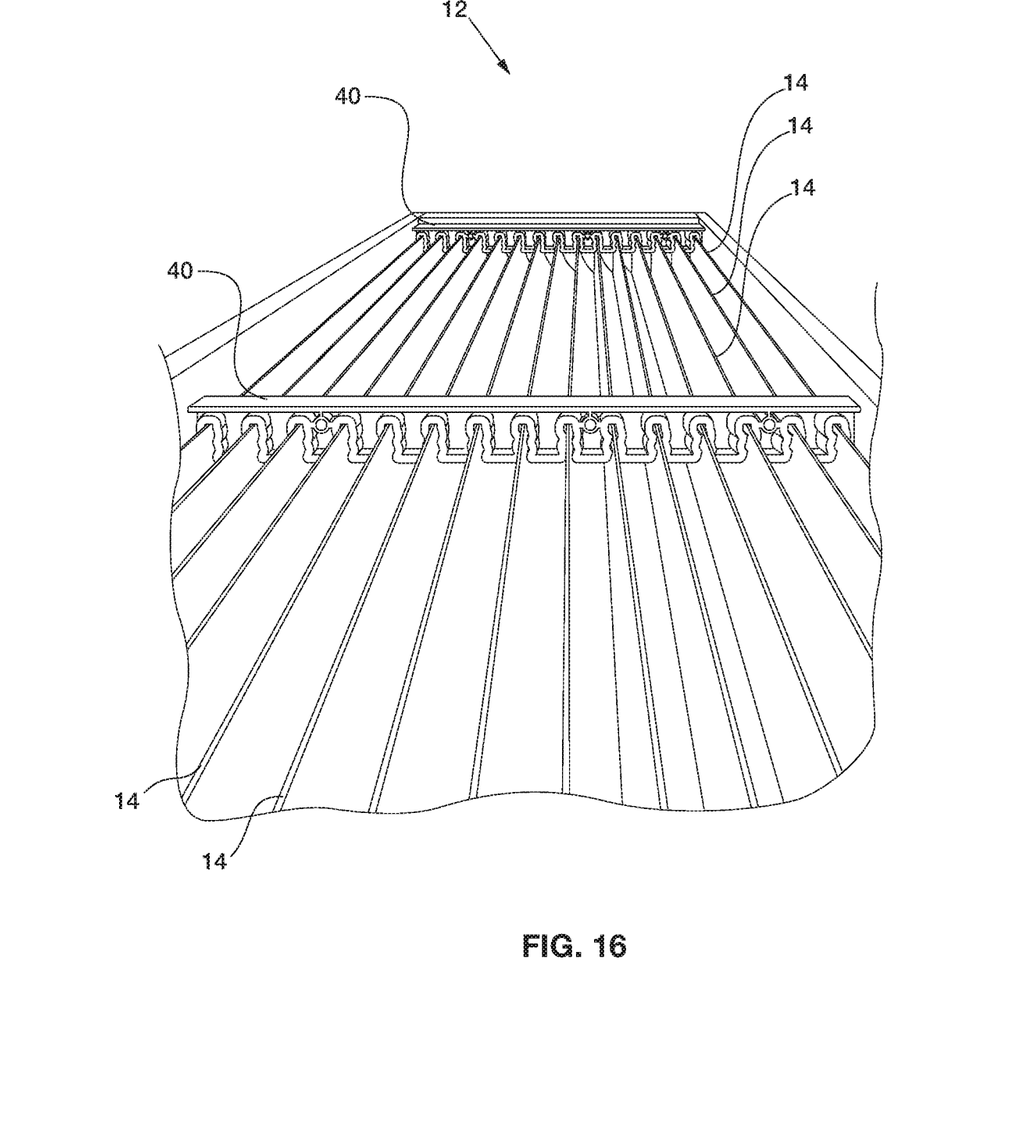
FIG. 16 shows the interface of light trap panels and one example of a light rails inside a light trap.

FIGS. 14-16 show examples of rails 40 and panels 14 in a light trap system 12. In some examples, more than one rail 40 may be included in a light trap. There may be a rail 40 on one terminating end of the panels and a rail 40 at the opposite terminating end of the panels. There may be a rail 40 between rails 40 at the terminating ends of the panels. The rails in the light trap may be parallel to one another. A rod (not shown) may extend in the rod inserts 50 of the multiple rails in a light trap system.

Numerous characteristics and advantages have been set forth in the foregoing description, together with details of structure and function. The disclosure, however, is illustrative only, and changes may be made in detail, especially in matters of shape, size, and arrangement of parts, within the principle of the invention, to the full extent indicated by the broad general meaning of the terms in which the general structural examples below are expressed. The terms "about" and "substantially" are used herein to allow for slight deviation from otherwise typically exact measures, such as slight deviations that occur due to manufacturing and extruding between railing batches, also considered as within 0.25 inches (or less) plus or minus a particular measurement.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein, and every number between the end points. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10, as well as all ranges beginning and ending within the end points, e.g. 2 to 9, 3 to 8, 3 to 9, 4 to 7, and finally to each number 1, 2, 3, 4, 5, 6, 7, 8, 9 and 10 contained within the range. Additionally, any reference referred to as being "incorporated herein" is to be understood as being incorporated in its entirety.

It is further noted that, as used in this specification, the singular forms "a," "an," and "the" include plural referents unless expressly and unequivocally limited to one referent.

What is claimed is:

1. A light trap for a poultry house for controlling light and air movement, the trap comprising:
    a plurality of panels having a length and a width, each panel including a top and bottom and two side edges,
        wherein each of the panels defines a waveform for at least a portion, the waveform traveling in the width direction of the panel,
        wherein the plurality of panels are spaced a distance D apart such that their waveform portions define a plurality of non-linear air-passages for allowing an airflow (AF) into or out of the poultry house at a velocity (V),
        wherein the air-passages have a resistance to airflow (RAF) and a light reduction
        reduction factor (RFL)
        wherein each of the waveform portions has a plurality of light deflective walls (LDWs) oriented non-parallel to the direction of the waveform,
        wherein the LDWs increase RFL, and
    a continuous I-beam shaped rail for accepting along a side edge of the panels a terminating side of the panels into a body of the continuous rail,
        wherein the continuous rail includes a series of integrally formed channels recessed into the body of the rail and spaced between a first end of the rail and a second end of the rail, wherein the channels recessed into the body stabilizes the panels along the side edge of the panels, and the continuous rail is perpendicularly situated to the panels along the side panel edges.

2. The trap of claim 1, wherein the waveform portions include at least three peaks with at least one of the three peaks being a negative peak.

3. The trap of claim 1, wherein the waveform portions include waves having a peak-to-peak amplitude chosen from at least one of about 0.5 to about 3 inches, about 0.5 to about 2 inches, and about 0.8 to about 1.4 inches.

4. The trap of claim 1, wherein the waveform portions have a wavelength chosen from at least one of about 2 to about 8 inches, about 3 to about 6 inches, and about 4 to about 5 inches.

5. The trap of claim 1, wherein the waveform portions are sinusoidal.

6. The trap of claim 4, wherein the waveform portions include LDWs positioned on at least one of: at least 25% of a wavelength, at least 50% of a wavelength, at least 75% of a wavelength; and about 100% of the wavelength.

7. The trap of claim 6, wherein the LDWs are positioned at concentration chosen from at least one of about 5 to about 20 LDWs/cm, about 8 to about 18 LDWs/cm; and about 10 to about 15 LDWs/cm.

8. The trap of claim 1, wherein the LDWs have a height chosen from at least one of about 0.01 mm to about 2 mm, about 0.05 to about 0.5 mm, and about 0.1 to about 0.5 mm.

9. The trap of claim 1, wherein the LDWs of one panel overlap, at least partially, with the LDWs of an adjacent panel.

10. The trap of claim 1, wherein the LDWs are oriented perpendicularly (±80°) relative to the direction of the waveform.

11. The trap of claim 1, wherein the LDWs are oriented perpendicularly (±5°) relative to the direction of the waveform.

12. The trap of claim 1, wherein AF is chosen from at least one of 2,000 to 30,000 cfm; 3,000 to 25,000 cfm; and 3,000 to 20,000 cfm.

13. The trap of claim 1, wherein V is chosen from at least one of 200 to 20,000 fpm; 300 to 15,000 fpm; and 400 to 12,000 fpm.

14. The trap of claim 1, wherein the RFL is increased by a factor chosen from at least one of: at least 1.2×, at least 1.3×, at least 1.4×, at least 1.5×, at least 1.6×, at least 1.7×, at least 1.8×, at least 1.9×, at least 2.0×, at least 2.1×, at least 2.2×, at least 2.3×, at least 2.4×, at least 2.4×, at least 2.5×, at least 2.6×, at least 2.7×, at least 2.8×, at least 2.9×, and at least 3.0×.

15. The trap of claim 14, wherein, at 600 fpm, the LDWs increase RFL without increasing RAF by greater than 0.25 inches H20.

16. The trap of claim 15, wherein, at 600 fpm, the LDWs increase RFL, without increasing RAF by greater than 0.10 inches H20.

17. A light trap for a poultry house, the trap comprising:
a plurality of panels having a length and a width, a top, a bottom, and two side edges, wherein each of the panels defines a waveform for at least a portion,
wherein the waveform of each of the plurality of panels travels in the width direction of the panel,
includes a peak-to-peak amplitude in the range of about 0.5 to about 3 inches,
includes a wavelength in the range of about 2 to about 8 inches, and
includes a plurality of light deflective walls (LDWs) oriented non-parallel to the direction of the waveform;
wherein the plurality of panels are spaced a distance D apart such that their waveform portions define a plurality of non-linear air-passages for allowing an airflow (AF) into or out of the poultry house at a velocity (V), the plurality of passages having a resistance to airflow (RAF) and a light reduction factor (RFL), and
a plurality of I-beam shaped rails having channels integrally recessed within a body of the I-beam shaped rails and formed along a bottom surface for movably securing the panels within the body of the I-beam shaped rails along a side edge of the rail, wherein the rails are secured to the plurality of panels along a panel edge surface.

18. The trap of claim 17, wherein the plurality of LDWs
have a height in the range of about 0.01 mm to about 2 mm, have a width in the range of about 0.01 mm to about 2 mm,
have a concentration in the range of about 5 to about 20 LDWs/cm, for at least one centimeter,
are oriented perpendicularly (±80°) relative to the direction of the waveform, and increase RFL by a factor of at least 1.2×.

* * * * *